US006506307B1

United States Patent
Hondroulis et al.

(12) 
(10) Patent No.: US 6,506,307 B1
(45) Date of Patent: *Jan. 14, 2003

(54) PROCESS FOR SORBING LIQUIDS USING TROPICAL FIBERS

(75) Inventors: Dimitrios George Hondroulis, Atlanta, GA (US); Katherine Tracy Bergquist-Kingham, Dunwoody, GA (US); Neville William Kingham, Dunwoody, GA (US)

(73) Assignee: Fybx Enviromental, Inc., Roswell, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/389,911

(22) Filed: Sep. 3, 1999

Related U.S. Application Data

(63) Continuation-in-part of application No. 08/832,753, filed on Apr. 4, 1997, now Pat. No. 6,027,652.

(51) Int. Cl.[7] .................................................. C02F 1/28
(52) U.S. Cl. ........................ 210/671; 210/691; 210/924
(58) Field of Search ................................ 210/671, 680, 210/691, 242.4, 282, 924

(56) References Cited

U.S. PATENT DOCUMENTS

| | | | |
|---|---|---|---|
| 151,662 A | 6/1874 | Herron | 162/26 |
| 264,168 A | 9/1882 | Jordan | 162/11 |
| 450,119 A | 4/1891 | Warrand | 57/295 |
| 450,120 A | 4/1891 | Warrand | 162/99 |
| 456,241 A | 7/1891 | Davis | 162/99 |
| 497,911 A | 5/1893 | Davis | 162/87 |
| 1,181,553 A | 5/1916 | Taylor et al. | 162/11 |
| 1,357,580 A | 11/1920 | Moody et al. | 205/690 |

(List continued on next page.)

OTHER PUBLICATIONS

Lab Safety Supply, Inc., Catalog pp. 586–598.
Metro Industrial Sales Co., Exsorbert Brochure.
Sorbent Control Systems, Inc., Sorbee Brochure.
G. N. Ramaswamy et al., Kenaf/Cotton Blends for Textiles, Family and Consumer Sciences Research Journal, 24:2 pp.180–190. Dec. 1995.
K. Russell, Mississippi hosts Japanese Paper & Pulp Executives on Kenaf Fact–finding Mission, Mississippi Business Journal, 18:23 Jun. 3, 1996.
Millsaps Sorbent and Environmental Laboratory, Final Report on Sorbency Evaluation for Kenaf, Aug. 31, 1993.
Boyd, C.R., & Ramaswamy, G.N. (1995). *Product Development Using a Kenaf Blend Textile*. Proceedings of International Kenaf Association, 173–178, Dallas, TX.
Borazjani, A. and Diehl, S.V. 1994. *Kenaf Core as an Enhancer of Bioremediation*. In "A Summary of Kenaf Production and Development Research (1989–1993)." MAFES Bulletin #1011. Miss. State Univ. May 1994, pp. 26–27.

*Primary Examiner*—Nars Cintins
(74) *Attorney, Agent, or Firm*—Troutman Sanders LLP; Gerald R. Boss

(57) ABSTRACT

A process is described for sorbing hydrophobic liquids using a plurality of dried, washed fibers originating from a tropical plant material having naturally hydrophobic fibers. The dried, washed fibers have been washed sufficiently to extract a substantial portion of natural liquids therefrom, thereby improving their hydrophobic absorptive properties. The dried, washed fibers are applied in communication with a body containing the hydrophobic liquid whereupon they sorb the hydrophobic liquid from the body.

13 Claims, 5 Drawing Sheets

U.S. PATENT DOCUMENTS

| | | | |
|---|---|---|---|
| 1,362,723 A | 12/1920 | Marr | 102/72 |
| 1,367,279 A | 2/1921 | Pomorski | 162/10 |
| 1,717,798 A | 6/1929 | Marr | 162/81 |
| 1,831,740 A | 11/1931 | Elöd | 162/20 |
| 1,882,657 A | 10/1932 | Elöd | 162/10 |
| 1,981,883 A | 11/1934 | Tappan et al. | 162/99 |
| 2,520,483 A | 8/1950 | Vanderjagt | 8/117 |
| 3,617,565 A | 11/1971 | Fahlvik | 210/40 |
| 3,791,990 A | 2/1974 | Fischer | 252/427 |
| 4,072,794 A * | 2/1978 | Tomita et al. | 428/378 |
| 4,172,039 A * | 10/1979 | Akiyama | 210/502 |
| 4,240,800 A | 12/1980 | Fischer | 44/51 |
| 4,343,680 A * | 8/1982 | Field et al. | 162/100 |
| 4,497,712 A * | 2/1985 | Cowling | 210/691 |
| 4,547,263 A | 10/1985 | Quame | 162/14 |
| 4,604,313 A * | 8/1986 | McFarland et al. | 428/172 |
| 4,659,478 A * | 4/1987 | Stapelfield et al. | 210/690 |
| 4,902,544 A * | 2/1990 | Kim et al. | 428/36.1 |
| 4,925,343 A * | 5/1990 | Raible et al. | 405/60 |
| 4,969,774 A | 11/1990 | Arseneault et al. | 405/60 |
| 5,009,790 A | 4/1991 | Bustamante et al. | 210/689 |
| 5,021,390 A * | 6/1991 | Hatton | 502/401 |
| 5,114,593 A * | 5/1992 | Diaz | 210/691 |
| 5,186,831 A * | 2/1993 | DePetris | 210/242.4 |
| 5,227,072 A * | 7/1993 | Brinkley | 210/671 |
| 5,229,006 A * | 7/1993 | Brinkley | 210/671 |
| 5,271,691 A | 12/1993 | Willet et al. | 405/60 |
| 5,352,780 A | 10/1994 | Webb et al. | 536/56 |
| 5,360,654 A * | 11/1994 | Anderson et al. | 428/98 |
| 5,403,478 A * | 4/1995 | Brinkley | 210/242 |
| 5,468,536 A * | 11/1995 | Whitcomb et al. | 428/98 |
| 5,492,881 A | 2/1996 | Diamond | 502/401 |
| 6,027,652 A * | 2/2000 | Hondroulis et al. | 210/671 |

\* cited by examiner

PROCESS FOR SORBING LIQUIDS USING TROPICAL FIBERS

"This application is a Continuation-In-Part of U.S. patent application Ser. No. 08/832,753, Apr. 4, 1997, now issued as U.S. Pat. No. 6,027,652."

BACKGROUND OF THE INVENTION

1. Technical Field

This invention relates generally to the use of a fibrous material to sorb liquids. Particularly, this invention relates to the use of processed, naturally hydrophobic tropical fibers such as banana, plantain, cavendish plant, pineapple, coconut, and palm, to recover spilled oil, gasoline, kerosene, solvents, hydrocarbons, pentachlorophenol (PCP), creosote or other liquids.

2. Description of the Prior Art

Spills of oil, solvents and hazardous materials are a continuing problem having serious environmental consequences, including damage to the oceans, beaches, inland rivers, streams and creeks, as well as detrimental effects upon the health of wildlife and humans. The need for oil and chemical products has created consistent growth in the chemical industry, including the transport and manufacturing of these compounds, resulting in increasing environmental problems associated with spills, accidents and improper disposal.

Sorbent materials, including both materials that absorb and materials that adsorb, have been used for many years in the cleanup of oil and hazardous materials by private industry and the federal government. Sorbent clay materials are currently the material of choice for absorbing or recovering oil or other hazardous chemicals on land. In industrial applications, these materials have the disadvantages of low sorbent capacity and a high density which make them both heavy and difficult to transport. Additionally, the abrasiveness and friability of these products may lead to increased wear of nearby industrial machinery. These clay based sorbents are not biodegradable and, therefore, pose an additional environmental problem because they must be disposed of in the limited space available in landfills. Peat, diatomaceous earth and vermiculite are sometimes used as alternatives to the clay based sorbents.

The primary sorbents used in remediation of spills of oil or other hazardous substances on water consist of synthetic materials such as polypropylene, which is currently the product of choice for industry and remediation specialists. However, since polypropylene is itself a synthetic chemical, its production handling can be the source of other environmental problems. Additionally, because these synthetic sorbents are not biodegradable and currently must be disposed of in landfills, they increase the load on the limited available landfill capacity. Therefore, a need exists for an efficient natural sorbent material which is not a source of environmental problems.

One process for alleviating the environmental problems associated with the production of oil or chemical sorbent materials is to use a sorbent system based on natural fibers. Over the last several decades, a wide variety of treated natural fibers have been used as sorbents of hazardous materials. These have included tree bark, peat, wood fiber, dealginate kelp, powdered lily, kenaf cores, puffed cereals, and a variety of other cellulosic materials. Each of these fiber types has disadvantages which have prevented them from becoming the material of choice for remediation of oil and chemical spills on land or in water.

The primary disadvantage of most of these fiber types is that they are naturally hydrophilic and, therefore, tend to sorb large quantities of water. Sorption of water increases the weight of these materials and can seriously decrease their ability to sorb the oil or hazardous chemical which these materials are intended to recover. It is possible to reduce or eliminate the tendency of some of these materials to sorb water by treatment with chemical additives to increase their hydrophobicity.

For example, in U.S. Pat. No. 5,021,390, Hatton teaches a composition for sorbing liquids consisting of various fibrous plant materials treated with the waterproofing agent sodium methyl silicate. In U.S. Pat. No. 5,492,881, Diamond teaches a sorbent system using finely ground cellulose treated with a hydrophobic agent such as paraffin, other waxes, polyvinyl alcohol, hydroxyethyl cellulose or the like. In U.S. Pat. No. 4,172,794, Akiyama discloses an oil absorbent composition made from a vegetable material, such as coconut husk, which has been impregnated with a hydrophobic-oleophilic substance such mineral oil, naphtha, kerosene, light oil, paraffin, or various other similar oils and fatty substances. In U.S. Pat. No. 4,072,039, Tomita et al. disclose an oil absorbent material comprising natural fibers, such as grass peat, coconut husk, or jute, which have been coated with a water-repellent, hydrophobic layer of paraffin and an elastic layer of latex. In each of these cases, hydrophobic additives must be used to make the fibers suitable for use as an oil sorbent material, adding to the manufacturing expense of the sorbent material and potentially further harming the environment.

Another disadvantage of previously disclosed natural fiber based sorbents is that most are generally only capable of sorbing 5–10 times their mass in oil or other chemicals. Additionally, most of these natural fiber compositions have a tendency to sink as they become saturated with oil, water or other chemicals, making recovery of these materials and sorbed chemical from a body of water extremely difficult or impossible.

Several of the previously disclosed fiber compositions are not readily biodegradable and therefore pose an additional environmental problem since these fibers will not easily degrade when disposed of in a landfill. For example, in U.S. Pat. No. 3,791,990, Fischer et al. teach an oil sorbent material composed of peat fibers dried to less than 10% by weight water. These fibers are not biodegradable, which, although beneficial from the stand point of reducing leaching of the liquids, results in a long lifetime in landfills. Overuse of the limited landfill capacity is a major environmental problem, and it is therefore desirable to provide a sorbent material which is readily biodegradable after use and recovery of the oil, solvent or other liquids.

Agricultural waste products also constitute an environmental problem. For example, banana stalks, plantain stalks, cavendish plant stalks, pineapple crowns, palm, palmetto and coconut fronds, and a variety of other tropical plant portions are presently thought of as waste agricultural byproducts in the countries in which they are produced. Currently these byproducts are disposed of in landfills, where they can attract insects and contribute to landfill capacity problems. Additionally, they may be discarded into rivers, where they oxidize and can cause potential environmental problems. In other instances, the byproducts are left on the ground to act as a natural fertilizer. Therefore, it would be beneficial to find a use for these agricultural byproducts products rather than disposing of them as waste.

Many of these tropical plant waste materials include a substantial content of naturally hydrophobic fibers.

Accordingly, one potential use for these materials is as a source of fibers to be used as an oil sorbent material. Unfortunately, in their natural state, these plant materials also include a high content of natural liquids which permeate the fibers, making them impractical for use in oil sorbent applications.

Accordingly, it is an object of the present invention to provide a process for sorbing liquid environmental contaminants such as spilled oil, kerosene, gasoline, solvents, hydrocarbons, PCP, and creosote.

Furthermore, it is an object of the present invention to provide a process for converting agricultural byproducts into fibers useful for sorbing liquid environmental contaminants.

It is yet another object of the present invention to provide a process for sorbing liquid environmental contaminants which minimizes the use of toxic or potentially environmentally harmful chemicals.

SUMMARY OF THE INVENTION

The above objectives are accomplished according to the present invention by providing a process for sorbing a hydrophobic liquid. In the present process, a plurality of dried, washed fibers are provided, which originate from a tropical plant material having naturally hydrophobic fibers and which have been washed sufficiently to extract a substantial portion of natural liquids to improve the hydrophobic absorptivity of the fibers. The dried, washed fibers are applied in communication with a body containing the hydrophobic liquid and sorb the hydrophobic liquid therefrom.

BRIEF DESCRIPTION OF THE DRAWINGS

The construction and design to carry out the invention will hereinafter be described together with other features thereof. The invention will be more readily understood from a reading of the following specification and by reference to the accompanying drawings forming a part thereof, wherein an example of the invention is shown and wherein.

DETAILED DESCRIPTION OF PREFERRED EMBODIMENT

In the preferred embodiment, naturally hydrophobic sorbent fibers 110 from tropical plants are processed to remove a substantial portion of their naturally occurring liquids and dried for use as an oil sorbent. These sorbent fibers 110 may be from any of a variety of tropical agricultural by-products including, but not limited to, banana stalks, plantain stalks, cavendish plant stalks, pineapple crowns, palm fronds and pinzote, palmetto fronds and coconut fronds.

The fibers used in the preferred embodiment of present invention are naturally "hydrophobic", meaning that they have an affinity for nonpolar compounds such as oils and hydrocarbons, and thus are capable of binding significant quantities of these compounds. The fibers are also generally permeated with a large number of capillaries which increase their effective surface area, further increasing their binding capacity. However, in the raw state, the fibers also have a content of approximately 80% by weight of natural liquids such as water, latex, oil and other natural juices. These natural liquids fill many of the capillaries which permeate the fibers, blocking them from absorbing additional liquids and decreasing their usefulness in sorbent applications. The presence of significant quantities of natural liquids can also cause the fibers to aggregate into a relatively impenetrable mass, further decreasing its usefulness in sorbent applications. However, upon removal of a substantial portion of these natural liquids, the fibers become capable of reabsorbing significant quantities of hydrophobic liquids and substantially deaggregate.

Figure 1:
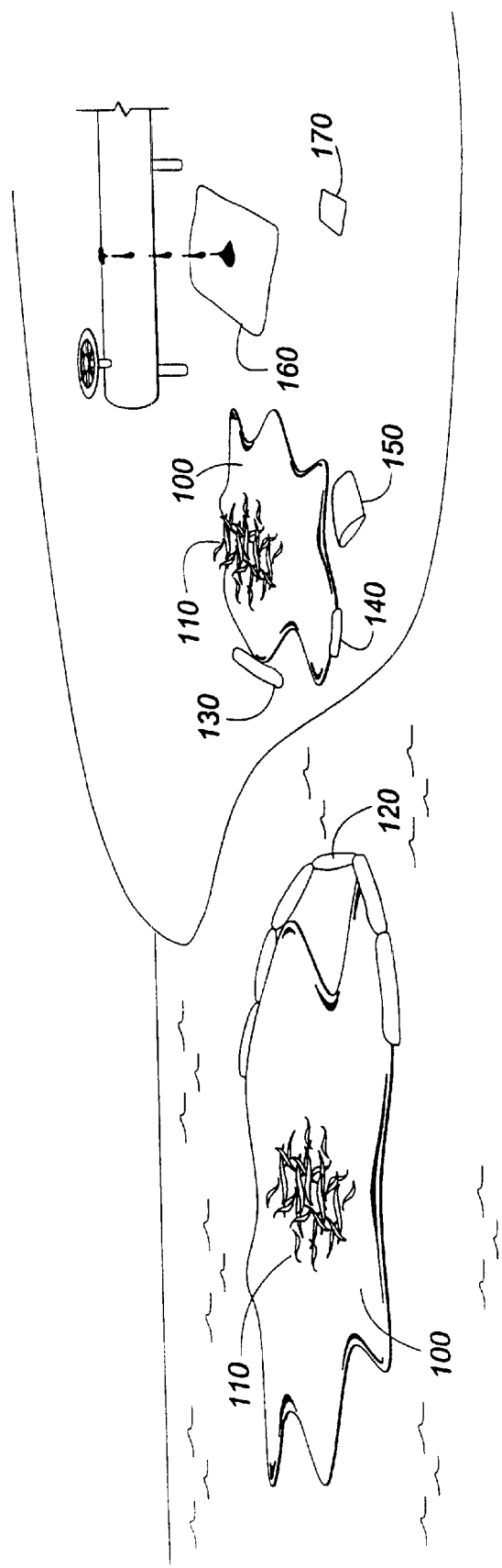
FIG. 1 is a diagram illustrating several processes whereby the tropical fiber sorbent product may be applied to a body of liquid.

Referring now to the figures in which like reference numerals indicate like or corresponding features, FIG. 1 shows several processes whereby a naturally hydrophobic tropical fiber sorbent product may be applied to a body of liquid 100, including as loose fiber 110, booms 120, socks 130, dikes 140, pillows 150, mats 160 or pads 170.

Figure 2:
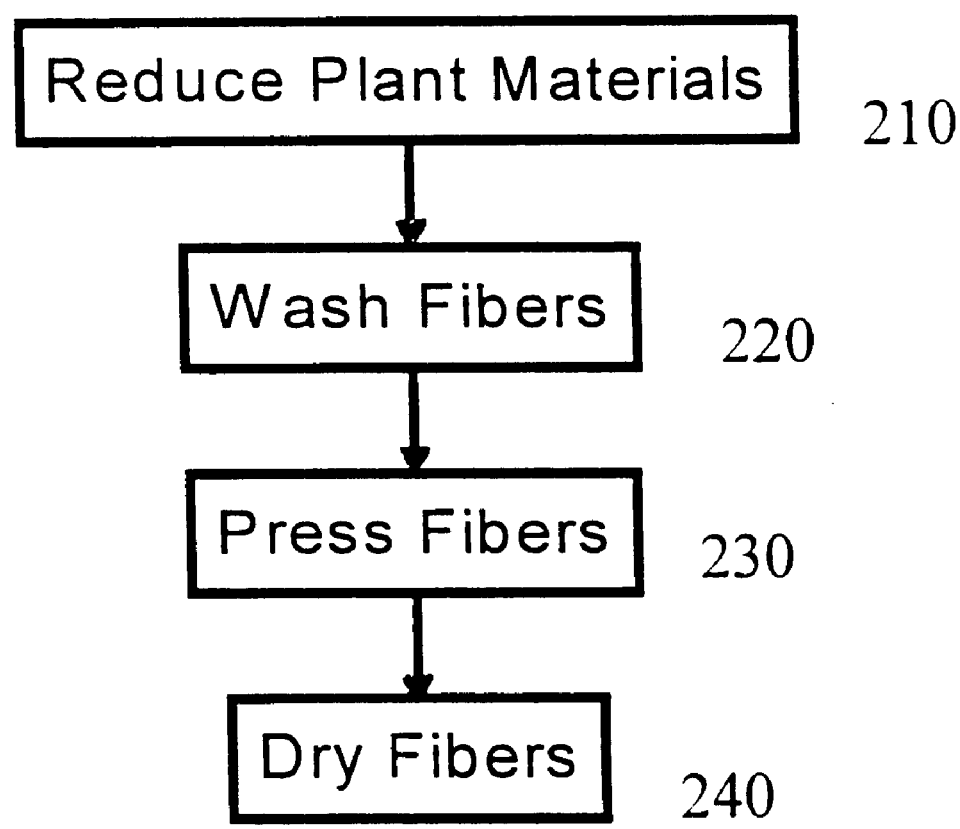
FIG. 2 is a diagram illustrating the steps used in processing the raw tropical plant materials into useful sorbent fibers.
Figure 3:
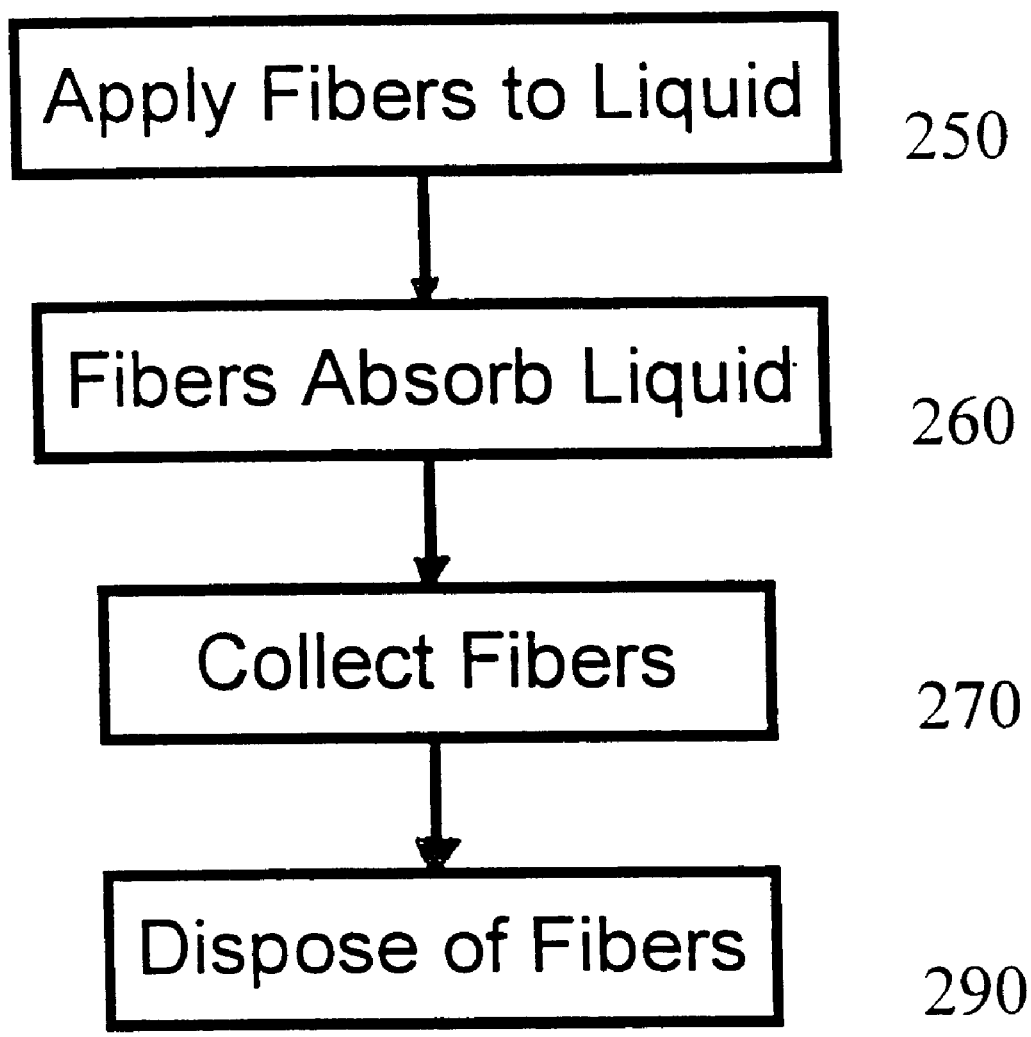
FIG. 3 is a diagram illustrating the steps for remediation of a spilled liquid.
Figure 4:
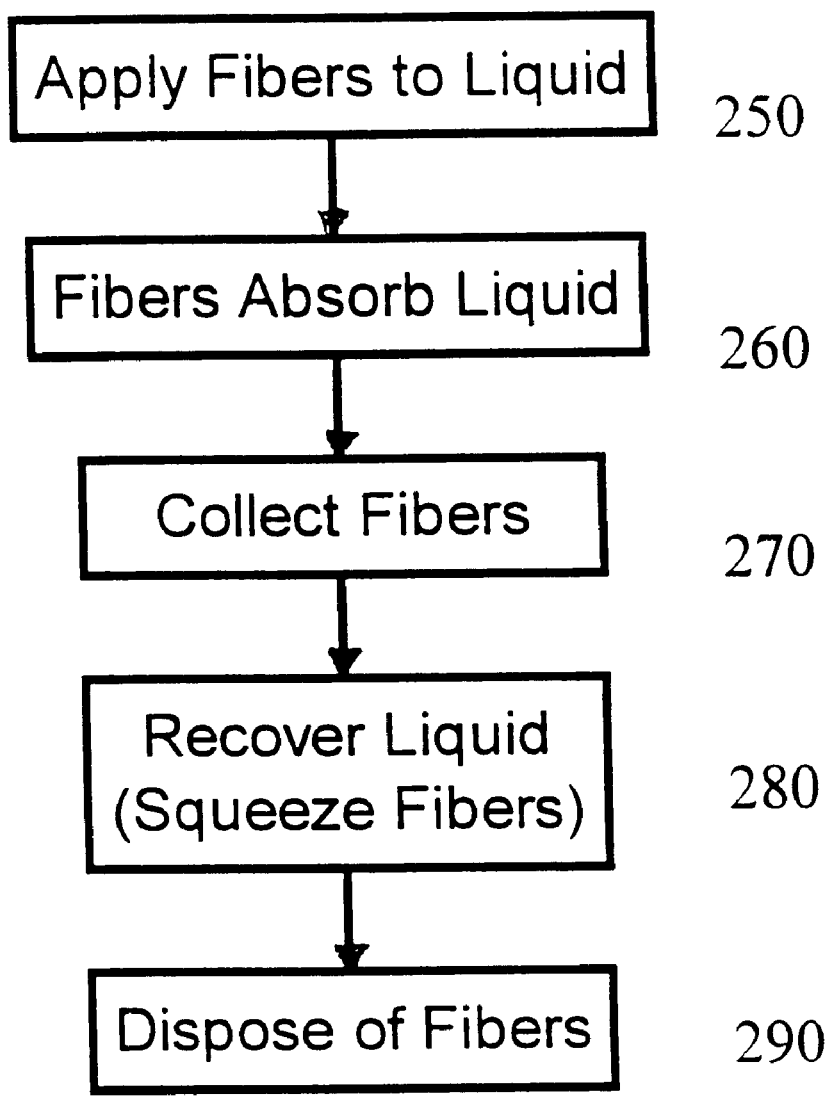
FIG. 4 is a diagram illustrating the steps used in remediation and recovery of a spilled liquid.
Figure 5:
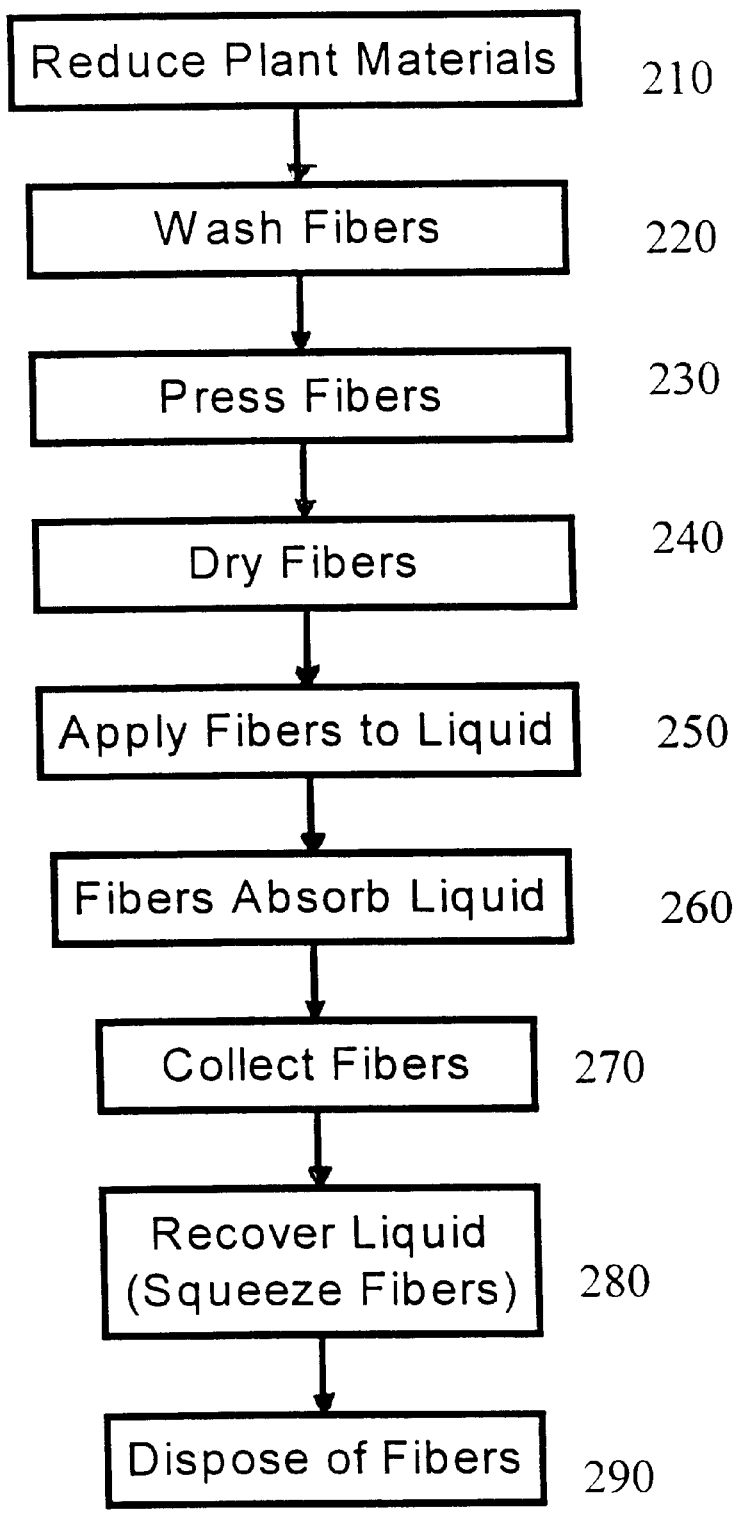
FIG. 5 is a diagram illustrating both the steps used to produce the fibers and the steps for remediation and recovery of a spilled liquid.

Referring to FIG. 2 and FIG. 5, once at the processing site, the raw plant materials are subjected to an initial reducing step 210 wherein they are cut, ground, shredded or otherwise converted into a mass of separated fibers. The separated fibers are subjected to a washing step 220 wherein they are washed to extract a portion of natural liquids including latex, oils, and other natural juices. The washed fibers are subjected to a pressing step 230 wherein they are pressed to further extract water, latex, oils, and other natural juices, and are then subjected to a drying step 240. This procedure may be automated.

In the preferred embodiment the raw plant materials are first reduced 210 in a roller with blades that draws the stalks or crowns into a series of rotating ¼" steel knives or blades. These blades cut the stalks into fibers ranging from ¼" to 1" in length and serve to separate the fibers. The separated fibers are then propelled through the neck of the grinder into the awaiting washer.

The fibers are washed 220 in an aqueous solution for a period of time sufficient to remove a substantial portion of their natural liquids such as latex, oils and other naturally occurring juices. In one presently preferred embodiment, the fibers are washed for a period of between 10 min. to 45 min, although additional washing will not harm the resultant fiber quality. During this washing step 220 the fibers may be subjected to the action of bladed paddles which act to agitate the fibers and further separate them. The fibers are then pumped out of the washer by a common sewer pump which also serves to further separate the fibers. The fibers are then deposited onto a steel mesh screen to separate the water from the fibers. Excess water can then be recycled back into the washing system.

The aqueous solution used at washing step 220 may include any wash solution capable of removing a substantial portion of the natural liquids including latex, oils and other natural juices from the raw fibers. In the simplest embodiment, a wash in water alone has been found to be sufficient to remove significant quantities of latex, oils and natural juices. However, improved removal of latex, oils and other natural juices has been found to occur when latex and oil solubilizing reagents are added to the wash solution. In a presently preferred embodiment, the aqueous solution used in wash step 220 is a mild alum solution containing between 0.001 and 5 percent alum by weight, and more preferably between 0.5 an 1.0 percent alum by weight to enhance the extraction of latex, oils, and other natural juices. However, one of ordinary skill in the art will also recognize that a variety of other solubilizing reagents including bases such as sodium hydroxide or potassium hydroxide, detergents and/ or surfactants could also likely be used to enhance the removal of latex, oils, and natural juices.

After washing, the fibers are subjected to a pressing step 230 for removal of a significant portion of water and additional portion of the remaining natural liquids especially including water and remaining quantities of latex, oils and other natural juices. The press exerts a high tonnage, and may consist of a hydraulic press, a screw press or a belt press. The resulting compressed fiber mass has a natural liquid content of approximately 25–30% by weight including water. This relatively low liquid content is easily achieved by performing the pressing step 230 after the initial separating 210 and washing 220 steps. The efficiency of the pressing step 230 is enhanced by removal of higher quantities of natural liquids in the preceding wash step 220. Accordingly, the pressing step 230 is less energy intensive when a solubilizing reagent is utilized in wash step 220 as discussed above.

After pressing 230, the fibers are subjected to a drying step 240 in which industrial strength dryer circulates hot air from an incinerator through the fibers to dry them to a liquid content of approximately 1–15%. Once dry, the fibers may optionally be subjected to further reducing steps to pulverize the fibers to ⅛" to ¼" in length. The fibers may then be baled by a conventional hay baler or bagged for transport and storage. The use of pressing step 240 to remove a substantial portion of water and natural liquids from the fibers prior to drying results in a reduction in the time and energy required to dry the fibers.

Removal of a substantial portion of the natural liquids (water, latex, oils, and other plant natural juices) from the raw naturally hydrophobic tropical fibers results in production useable fibers which are capable of reabsorbing large amounts of hydrophobic liquids. In the preferred embodiment, the processed tropical fibers have a final water and natural liquid content of less than 15% by weight. Additionally, at least 50% of the naturally occurring latex, oils and other natural juices should be removed to ensure that the fibers are suitably absorbent. More preferably, the fibers are washed and pressed more thoroughly, removing 90–99% of the naturally occurring latex, oils and other natural juices and further increasing the capacity of the fibers to absorb hydrophobic liquids without requiring treatment with hydrophobic additives.

Naturally hydrophobic tropical fibers processed in this manner are especially well suited to recovery of oil from bodies of water because they are capable of sorbing up to 15 times their own weight in petroleum products, do not significantly sorb water, will float indefinitely and will aggregate on open water making recovery both simple and inexpensive. Additionally, the processed tropical fibers are well suited to use in industrial or mechanical areas since they are neither abrasive nor friable, and therefore are not a source of wear for industrial machinery.

The processed tropical fibers provide several additional environmental advantages over the prior art sorbent materials for sorbing oil or other hazardous chemicals. Because the tropical fiber sorbent material is biodegradable, it is not harmful to the environment either in its production, use or disposal. Furthermore, the use of processed tropical fibers as a sorbent provides a use for tropical agricultural byproducts which would otherwise be disposed of as waste material in potentially environmentally harmful ways. The tropical fiber material is also relatively inexpensive since it may be produced from plentiful agricultural byproducts which are currently largely unused.

One skilled in the art will recognize that many variations of this embodiment are practical including conversion of this system to a continuous flow system wherein raw plant material is constantly being reduced to fibers and washed followed by pressing in a screw press or other means to constantly squeeze out moisture, and by further continuous flow separating steps similar to those previously described.

Referring now to FIGS. 1, 3, 4 and 5, the sorbent tropical fiber material may be applied 250 directly to the surface of an oil spill on land or water by dropping the loose sorbent fibers 110 over the body of liquid 100. Alternatively, the loose fibers 110 may be applied 250 by being blown out over the spill by a blower such as those used to blow fibrous insulation into a wall or ceiling. If the loose fibers 110 are used on land, they may be swept up and collected 270 once they have sorbed the spilled liquid.

Since the loose fibers 110 are naturally hydrophobic they will sorb hydrophobic liquids and additionally will tend to aggregate if dispersed over the surface of a body of water. Once aggregated, the loose fibers 110 will float indefinitely and may be easily collected 270 from the body of water.

The tropical fiber material may be packaged into a wide variety of forms including booms 120, socks 130, dikes 140, pillows 150 and the like. Generally this is accomplished by filling a porous package with a quantity of the loose tropical fiber material 110. The packaging material may be made of polypropylene, nylon, cotton or other similar materials, and ideally should be permeable to oil while excluding water. Booms 120, as commonly recognized in the art, are large sausage-shaped containers which are stitched on one side to contain the fiber material and may be attached end to end to contain a waterborne spill of oil or other hazardous liquid. Booms 120 usually range in size from a 4" to 8" diameter and form 3' to 6' in length. Socks 130 and dikes 140 are smaller than booms, but similar in structure. Pillows 150 are sealed pouches containing the loose fiber and can be any shape.

Typically, the booms 120 will be used on open water by joining together the booms to form a ring encircling the spilled liquid 100. Alternatively, the booms 120 may be strung together just offshore to sorb as much of the oil or other hazardous liquid 100 as possible before it can be deposited on the beach or shoreline where it is likely to cause the most significant environmental damage. The socks 130, dikes 140 and pillows 150 may be used in a similar fashion, or may be placed directly on the site of a smaller body of liquid 100 to sorb the liquid.

Alternatively, mats 160 and pads 170 made of compressed fiber with no outer covering may be used. In a preferred embodiment, these mats 160 have a thickness of ¼–½ inch and may range in size from 2'×2' to 4'×4'. These mats 160 or pads 170 may be used to sorb spilled oil, solvents or other hazardous chemicals on land by simply bringing the packaged fibers into contact with the spill and allowing sorption to occur. The fiber mats 160 and pads 170 are particularly useful for sorbing spills of oil and other automotive liquids from a garage floor or driveway, and may be placed under a work area in anticipation of spills occurring during automotive or industrial repairs. When the packaged fibers, mats 160 or pads 170 are saturated with liquid, or the user decides enough of the liquid has been sorbed the packages, mats or pads may be collected and, if necessary, replaced with new packages, mats or pads.

The fibers 110 may also be applied to a contaminated liquid as a filtration medium through which the contaminated liquid is passed. When used as a filter, the fibers may be included in-line in a forced flow fluid system, wherein the contaminated liquid is pumped through the filtration material to more quickly treat high liquid volumes.

It is possible to include a recovery step 280 wherein a significant portion of a spilled liquid may be recovered after sorption by the tropical fiber material by pressing the fibers to squeeze out the liquid. The fibers may then be either disposed 290 of or reused at the owners discretion. Alternatively, if the liquid is combustible, the disposal step 290 may include thermally treating (e.g. incinerating) the fibers. Fibers saturated with combustible liquid may also serve as a valuable fuel source if thermally treated by burning in an appropriate furnace or boiler. For less hazardous liquids such as vegetable oil or animal waste the disposal step 290 may include disposal of the fibers in a landfill.

The loose sorbent fibers 110 are also useful in the stabilization or solidification of chemical contaminants in contaminated soil, sludge, sand, clay, gravel, dust or other semi-solids. In this application, the loose fibers 110 are mixed directly with the into the semi-solid or may be mixed with cement-based stabilization agents to reduce the leachability of contaminants from solidified soil. It is not necessary to recover the loose fibers 110 in this application as they may serve to reduce leachability of the chemicals until either the fibers or chemicals degrade over time.

When mixed with a semisolid, the loose sorbent fibers 110 also provide a source of organic material to encourage the growth of bacteria and other microscopic organisms, thereby enhancing the biodegradation of the contaminating liquid. Additionally, since bacteria and other microscopic organisms are initially present in the fibers 110, the fibers 110 may serve as a source of organisms to enhance bioremediation of the contaminated liquid.

It thus will be appreciated that the objects of this invention have been filly and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A process for sorbing a hydrophobic liquid comprising the steps of:
   providing a plurality of dried, washed fibers originating from a banana stalk having naturally hydrophobic fibers, wherein said washed fibers have been washed sufficiently to extract a substantial portion of natural liquids to improve the hydrophobic absorptivity of said fibers;
   applying said plurality of dried, washed fibers in communication with a body containing the hydrophobic liquid; and
   sorbing the hydrophobic liquid from the body with said plurality of dried, washed fibers.

2. A process for sorbing a hydrophobic liquid using a plurality of fibers originating from a naturally hydrophobic tropical plant material, wherein said tropical plant material also has a high content of natural liquids, said process comprising the steps of:
   reducing the naturally hydrophobic tropical plant material to a plurality of separated natural fibers;
   washing the plurality of separated natural fibers in an aqueous solution having a solubilizing base sufficiently to remove a substantial portion of said natural liquids from said plurality of separated natural fibers to improve the hydrophobic absorptivity of said fibers;
   drying said plurality of washed natural fibers;
   applying said plurality of dried, washed natural fibers in communication with a body containing the hydrophobic liquid; and
   sorbing the hydrophobic liquid from the body with said plurality of dried, washed natural fibers.

3. The process of claim 2, wherein said plurality of dried, washed fibers has a water and natural liquid content not greater than 15% by weight.

4. The process of claim 2, wherein said plurality of dried, washed fibers originate from a naturally hydrophobic tropical plant material selected from the group consisting of: banana stalks, plantain stalks, cavendish plant stalks, pineapple crowns, coconut fronds, palmetto fronds and palm fronds.

5. The process of claim 2, further including the step of pressing said washed fibers to remove an additional portion of water and natural liquids therefrom.

6. The process of claim 2, wherein said applying step includes the step of applying said plurality of dried, washed fibers in communication with a body of water containing said hydrophobic liquid.

7. The process of claim 2, wherein said applying step includes the step of applying said plurality of dried, washed fibers in communication with a semi-solid body contaminated with said hydrophobic liquid.

8. The process of claim 7, further comprising the step of allowing said plurality of dried, washed fibers to biodegrade while in communication with the semi-solid body, thereby enhancing biodegradation of said hydrophobic liquid and decreasing the time required for said hydrophobic liquid to degrade.

9. The process of claim 2, wherein said applying step includes the step of applying said dried, washed fibers as a filtration medium through which the body containing the hydrophobic liquid is passed.

10. The process of claim 2, further comprising the step of collecting the plurality of dried, washed fibers following sorption of the hydrophobic liquid.

11. The process of claim 10, further comprising the step of disposing of the plurality of dried, washed fibers.

12. The process of claim 2, further comprising the step of recovering the hydrophobic liquid from the plurality of dried, washed fibers.

13. The process of claim 12, wherein said liquid recovering step includes the step of compressing said plurality of dried, washed fibers.

* * * * *